United States Patent
Fukuhara et al.

(10) Patent No.: US 9,562,115 B2
(45) Date of Patent: *Feb. 7, 2017

(54) DISPERSION STABILIZER FOR SUSPENSION POLYMERIZATION AND METHOD FOR PRODUCING VINYL RESIN

(71) Applicant: KURARAY CO., LTD., Kurashiki-shi (JP)

(72) Inventors: Tadahito Fukuhara, Okayama (JP); Yosuke Kumaki, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/910,595

(22) PCT Filed: Aug. 6, 2014

(86) PCT No.: PCT/JP2014/004115
§ 371 (c)(1),
(2) Date: Feb. 5, 2016

(87) PCT Pub. No.: WO2015/019614
PCT Pub. Date: Feb. 12, 2015

(65) Prior Publication Data
US 2016/0194412 A1    Jul. 7, 2016

(30) Foreign Application Priority Data

Aug. 7, 2013 (JP) ................................. 2013-164605

(51) Int. Cl.
| | | |
|---|---|---|
| *C08F 2/20* | (2006.01) | |
| *C08F 18/04* | (2006.01) | |
| *C08F 8/12* | (2006.01) | |
| *B01F 17/00* | (2006.01) | |
| *C08F 114/06* | (2006.01) | |
| *C08L 29/04* | (2006.01) | |
| *C08F 2/30* | (2006.01) | |

(52) U.S. Cl.
CPC ............ *C08F 2/20* (2013.01); *B01F 17/0028* (2013.01); *C08F 8/12* (2013.01); *C08F 18/04* (2013.01); *C08F 114/06* (2013.01); *C08L 29/04* (2013.01); *C08F 2/30* (2013.01); *C08L 2201/54* (2013.01)

(58) Field of Classification Search
CPC ......... C08F 2/20; C08F 116/06; C08F 114/06; C08F 18/04; C08F 8/12; C08F 2/30; B01F 17/0028; C08L 29/04; C08L 2201/54

USPC ......................................................... 524/557
See application file for complete search history.

(56) References Cited

U.S. PATENT DOCUMENTS 5,349,008 A    9/1994    Takada et al.

FOREIGN PATENT DOCUMENTS

| JP | 54-025990 A | | 2/1979 |
|---|---|---|---|
| JP | 54025990 | * | 2/1979 |
| JP | 54025990 A | * | 2/1979 |
| JP | 55-137105 A | | 10/1980 |
| JP | 56055403 | * | 5/1981 |
| JP | 56055403 A | * | 5/1981 |
| JP | 57-028121 A | | 2/1982 |
| JP | 57-105410 A | | 6/1982 |
| JP | 59-166505 A | | 9/1984 |
| JP | 09-183805 A | | 7/1997 |
| WO | 91/15518 A1 | | 10/1991 |

OTHER PUBLICATIONS

JP 54025990 (Machine Translation of Abstract) & JP56055403 (Machine Translation of Abstract).*
International Search Report issued on Oct. 21, 2014 for PCT/JP2014/004115 filed on Aug. 6, 2014.

* cited by examiner

*Primary Examiner* — Michael M Bernshteyn
(74) *Attorney, Agent, or Firm* — Oblon, McClelland, Maier & Neustadt, L.L.P.

(57) ABSTRACT

The present invention provides an easy-to-handle dispersion stabilizer for suspension polymerization that meets the following requirements: even if the amount of the dispersion stabilizer for suspension polymerization used for suspension polymerization of a vinyl compound is small, the resulting vinyl resin has high plasticizer absorptivity and is easy to work with; it is easy to remove residual monomer components from the resulting vinyl resin; and the resulting vinyl resin contains fewer coarse particles. The present invention relates to a dispersion stabilizer for suspension polymerization in the form of an aqueous liquid. This dispersion stabilizer contains, at a concentration of 20 mass % or more and 50 mass % or less, a PVA having a degree of saponification of 35 mol % or more and 65 mol % or less, a viscosity average degree of polymerization of 100 or more and 480 or less, a terminal aliphatic hydrocarbon group having 6 to 12 carbon atoms, and a block character of residual ester groups of 0.5 or more. In this dispersion stabilizer, the viscosity average degree of polymerization (P) of the PVA and the degree of modification (S) of the aliphatic hydrocarbon group satisfies $50 \leq S \times P/1.880 \leq 100$.

6 Claims, No Drawings

DISPERSION STABILIZER FOR SUSPENSION POLYMERIZATION AND METHOD FOR PRODUCING VINYL RESIN

TECHNICAL FIELD

The present invention relates to a dispersion stabilizer for suspension polymerization of a vinyl compound. The present invention also relates to a method for producing a vinyl resin in which suspension polymerization of a vinyl compound is conducted in the presence of the dispersion stabilizer for suspension polymerization.

BACKGROUND ART

Conventionally, suspension polymerization of vinyl compounds (for example, vinyl chloride) has been conducted to obtain vinyl resins from the vinyl compounds. It has been known to use a partially saponified vinyl alcohol polymer (hereinafter, a vinyl alcohol polymer is sometimes abbreviated as "PVA") as a dispersion stabilizer for suspension polymerization of vinyl compounds.

The requirements for a dispersion stabilizer for suspension polymerization of vinyl compounds include: (1) even if the amount of the dispersion stabilizer for suspension polymerization used is small, the resulting vinyl resin has high plasticizer absorptivity and is easy to work with; (2) it is easy to remove residual monomer components from the resulting vinyl resin; (3) the resulting vinyl resin contains fewer coarse particles; and (4) the dispersion stabilizer for suspension polymerization has good handleability.

Demand for dispersion stabilizers that are more effective in meeting these requirements (1) to (4) is increasing more and more. In particular, with respect to the above requirement (2) for easy removal of monomer components, for example, the restrictions on the amount of residual monomers in polyvinyl chloride used for medical and food applications are very severe. If it is difficult to remove residual vinyl chloride monomers in polyvinyl chloride particles in the drying step after polymerization, drying under high-temperature conditions or drying for a long time is needed to remove the residual monomers. In this regard, even for polyvinyl chloride for general applications, there is an increasing demand, for example, for energy cost reduction in such drying. With respect to the above requirement (4) for ease of handling, the use of organic solvents such as methanol is considered undesirable at present from the environmental standpoint, and there is a demand for a dispersion stabilizer for suspension polymerization in the form of a low-viscosity and high-concentration aqueous liquid.

Even if a traditionally-used common partially saponified PVA is used as a dispersion stabilizer for suspension polymerization to respond to these increasing demands for more effective stabilizers, it is rather difficult for such a common PVA to fully meet these enhanced requirements.

Patent Literatures 1 and 2 each disclose a method for making a partially saponified PVA more effective as a dispersion stabilizer for suspension polymerization and propose the use of a PVA having a terminal alkyl group for suspension polymerization of a vinyl compound. However, in this method, if the degree of saponification and degree of polymerization of the PVA are low, the PVA is insoluble in water and cannot meet the requirement (4), although it is effective to some extent in meeting the above requirements (1) and (2). The water solubility is improved by increasing the degree of saponification, but the requirements (1) and (2) cannot be met instead.

Thus, it can be said that no dispersion stabilizer for suspension polymerization of vinyl compounds that fully meet these enhanced requirements (1) to (4) has been found up to now. Nor can the PVA-based dispersion stabilizers for suspension polymerization disclosed in Patent Literatures 1 and 2 fully meet these requirements.

CITATION LIST

Patent Literature

Patent Literature 1: JP 59(1984)-166505 A
Patent Literature 2: JP 54(1979)-025990 A

SUMMARY OF INVENTION

Technical Problem

It is an object of the present invention to provide an easy-to-handle dispersion stabilizer for suspension polymerization that meets the following requirements: even if the amount of the dispersion stabilizer for suspension polymerization used for suspension polymerization of a vinyl compound is small, the resulting vinyl resin has high plasticizer absorptivity and is easy to work with it is easy to remove residual monomer components from the resulting vinyl resin; and the resulting vinyl resin contains fewer coarse particles.

Solution to Problem

The present inventors have found that the object of the present invention is accomplished by a dispersion stabilizer for suspension polymerization in the form of an aqueous liquid, containing: a vinyl alcohol polymer (A) having a degree of saponification of 35 mol % or more and 65 mol % or less, a viscosity average degree of polymerization of 100 or more and 480 or less, a terminal aliphatic hydrocarbon group having 6 to 12 carbon atoms, and a block character of residual ester groups of 0.5 or more and water, wherein the vinyl alcohol polymer (A) is present at a concentration of 20 mass % or more and 50 mass % or less, and a relationship between the viscosity average degree of polymerization (P) of the vinyl alcohol polymer (A) and a degree of modification (S) of the aliphatic hydrocarbon group satisfies the following formula (1):

$$50 \leq S \times P/1.880 \leq 100 \quad (1)$$

Thus, the present inventors have completed the present invention.

Specifically, the present invention relates to:
[1] a dispersion stabilizer for suspension polymerization in the form of an aqueous liquid, containing: a vinyl alcohol polymer (A) having a degree of saponification of 35 mol % or more and 65 mol % or less, a viscosity average degree of polymerization of 100 or more and 480 or less, a terminal aliphatic hydrocarbon group having 6 to 12 carbon atoms, and a block character of residual ester groups of 0.5 or more; and water, wherein
the vinyl alcohol polymer (A) is present at a concentration of 20 mass % or more and 50 mass % or less, and
a relationship between the viscosity average degree of polymerization (P) of the vinyl alcohol polymer (A) and a degree of modification (S) of the aliphatic hydrocarbon group satisfies the following formula (1);

$$50 \leq S \times P/1.880 \leq 100 \tag{1}$$

[2] the dispersion stabilizer for suspension polymerization as defined in the above [1], wherein the viscosity average degree of polymerization of the vinyl alcohol polymer (A) is 150 or more;

[3] the dispersion stabilizer for suspension polymerization as defined in the above [1] or [2], further containing a vinyl alcohol polymer (B) having a degree of saponification of more than 65 mol % and a viscosity average degree of polymerization of more than 480;

[4] the dispersion stabilizer for suspension polymerization as defined in the above [3], wherein a mass ratio between the vinyl alcohol polymer (A) and the vinyl alcohol polymer (B) ([vinyl alcohol polymer (A)]/[vinyl alcohol polymer (B)]) is 10/90 to 55/45 in terms of solid content ratio;

[5] a method for producing a vinyl resin, including conducting suspension polymerization of a vinyl compound in the presence of the dispersion stabilizer for suspension polymerization as defined in any one of the above [1] to [4]; and

[6] the method as defined in the above [5], wherein the suspension polymerization is conducted in the presence of water, and a mass ratio between the vinyl compound and the water ([vinyl compound]/[water]) is more than 3/4.

Advantageous Effects of Invention

Since the dispersion stabilizer for suspension polymerization of the present invention is in the form of a low-viscosity and high-concentration aqueous liquid, it has good handleability. When suspension polymerization of a vinyl compound is conducted in the presence of the dispersion stabilizer for suspension polymerization of the present invention, fewer coarse particles are formed due to high polymerization stability, and the resulting vinyl resin particles have a uniform particle size. Furthermore, even if the amount of the dispersion stabilizer for suspension polymerization of the present invention used is small, the resulting vinyl resin particles have high plasticizer absorptivity and are easy to work with. In addition, the rate of removing residual vinyl compound components from vinyl resin particles per unit time is high, and the resulting vinyl resin particles have good monomer removability.

DESCRIPTION OF EMBODIMENTS

<Dispersion Stabilizer for Suspension Polymerization>

The dispersion stabilizer for suspension polymerization of the present invention contains a vinyl alcohol polymer (A) having a specific structure and water (in this description, the vinyl alcohol polymer (A) is sometimes abbreviated simply as "PVA(A)", unless otherwise indicated). This dispersion stabilizer for suspension polymerization may further contain a PVA other than PVA(A) (for example, a vinyl alcohol polymer (B), as described later, having a degree of saponification of more than 65 mol % and a viscosity average degree of polymerization of more than 480) and other components. These components are each described in detail.

[PVA(A)]

PVA(A) used in the present invention has a terminal aliphatic hydrocarbon group, and it is important that the carbon number of the terminal aliphatic hydrocarbon group contained in PVA(A) be 6 or more and 12 or less in terms of the production efficiency of PVA(A) and the requirements for the dispersion stabilizer. When the carbon number of the terminal aliphatic hydrocarbon group is less than 6, the boiling point of a chain transfer agent for introducing an aliphatic hydrocarbon group is too low, which makes it difficult to separate the chain transfer agent from other materials (vinyl ester monomers such as vinyl acetate and a solvent such as methanol) in a recovery step in the production of PVA(A). When the carbon number of the terminal aliphatic hydrocarbon group is less than 6, it is difficult to remove monomer components from the resulting vinyl resin particles and the plasticizer absorptivity of the vinyl resin particles decreases. The carbon number of the terminal aliphatic hydrocarbon group in PVA(A) is preferably 8 or more. On the other hand, when the carbon number of the terminal aliphatic hydrocarbon group in PVA(A) is more than 12, the solubility of the chain transfer agent in a solvent such as methanol, which is suitably used in the polymerization process in the production of PVA(A), decreases. Therefore, in an operation in which a chain transfer agent for introducing an aliphatic hydrocarbon group during polymerization is dissolved in a solvent such as methanol and the resulting solution is sequentially added, precipitation of the chain transfer agent occurs due to its low solubility, which makes it difficult to further add the solution. Furthermore, the addition of the solution containing the chain transfer agent remaining undissolved results in a heterogeneous polymerization reaction. As described above, the carbon number of more than 12 leads to complex operations in the production process and product quality control problems. In addition, even if the PVA thus produced is used as a dispersion stabilizer for suspension polymerization, it is difficult to remove monomer components from the resulting vinyl resin particles.

The structure of the terminal aliphatic hydrocarbon group having 6 to 12 carbon atoms in PVA(A) is not particularly limited, and it may be linear, branched, or cyclic. Examples of the aliphatic hydrocarbon group include a saturated aliphatic hydrocarbon group (alkyl group), an aliphatic hydrocarbon group having a double bond (alkenyl group), and an aliphatic hydrocarbon group having a triple bond (alkynyl group). In terms of the economic efficiency and productivity of a chain transfer agent for introducing an aliphatic hydrocarbon group, the aliphatic hydrocarbon group is preferably an alkyl group, and more preferably a linear alkyl group or a branched alkyl group.

The manner in which the aliphatic hydrocarbon group is bonded to the terminal of PVA(A) is not particularly limited. Preferably, in terms of ease of production, the aliphatic hydrocarbon group is bonded directly to the terminal of the main chain of PVA(A) through a thioether bond (—S—). Preferably, PVA(A) has an alkylthio group, an alkenylthio group, or an alkynylthio group bonded directly to the terminal of the main chain of PVA(A). More preferably, PVA(A) has an alkylthio group bonded directly to the terminal of the main chain of PVA(A).

Examples of the alkylthio group having 6 to 12 carbon atoms include a n-heyxylthio group, a cyclohexylthio group, an adamantylthio group, a n-heptylthio group, a n-octylthio group, a n-nonylthio group, a n-decylthio group, a n-undecylthio group, a n-dodecylthio group, and a t-dodecylthio group.

PVA(A) used in the present invention is a partially saponified PVA, and therefore contains, as repeating units, a vinyl alcohol unit and a vinyl ester monomer unit. It is important that the degree of saponification of PVA(A) be 35 mol % or more and 65 mol % or less, in terms of the requirements for the dispersion stabilizer. When the degree of saponification of PVA(A) is less than 35 mol %, various problems occur such that it is difficult to remove monomer components from vinyl resin particles obtained by suspension polymerization of a vinyl compound, the plasticizer absorptivity of the resulting vinyl resin particles decreases, and the water solubility of PVA(A) decreases and PVA(A) is precipitated to form a precipitate when water is added. These problems make it difficult to provide PVA(A) in the form of a high-concentration aqueous liquid. The degree of saponification of PVA(A) is preferably 40 mol % or more, more preferably 44 mol % or more, and even more preferably 47 mol % or more. On the other hand, when the degree of saponification of PVA(A) is more than 65 mol %, it is difficult to remove monomer components from vinyl resin particles obtained by suspension polymerization of a vinyl compound, the plasticizer absorptivity of the resulting vinyl resin particles decreases, and PVA(A) in the form of a high-concentration aqueous liquid has an increased viscosity and thus has reduced handleability. The degree of saponification of PVA(A) is preferably 63 mol % or less, more preferably 61 mol % or less, even more preferably less than 60 mol %, and most preferably 58 mol % or less.

The degree of saponification of PVA(A) can be determined by $^1$H-NMR spectroscopy, based on the ratio of hydroxyl groups calculated as vinyl alcohol units to residual ester groups calculated as vinyl ester monomer units. The degree of saponification can also be determined by the method according to JIS K 6726 (1994).

PVA(A) used in the present invention may further contain a repeating unit other than a vinyl ester monomer unit and a vinyl alcohol unit, without departing from the scope of the present invention. Examples of the repeating unit include units derived from comonomers (hereinafter also referred to as comonomer units) copolymerizable with vinyl ester monomers. Examples of the comonomers are described later. The content of the comonomer units is preferably 10 mol % or less of all the repeating units of PVA(A).

The degree of saponification of PVA(A) containing the above-mentioned optional comonomer units also can be determined by $^1$H-NMR spectroscopy based on the ratio of hydroxyl groups to residual acetic acid groups or by the method according to JIS K 6726 (1994). However, when the latter method is used to determine the degree of saponification, the following correction should be made. The repeating units of the PVA include copolymerized comonomer units in addition to vinyl ester monomer units and vinyl alcohol units. If the degree of saponification is calculated without any correction, the difference between the resulting degree of saponification and the true degree of saponification increases as the molecular weight and the degree of modification of the repeating units other than the vinyl ester monomer units and the vinyl alcohol units increase. Therefore, when the degree of saponification of a PVA having repeating units other than vinyl ester monomer units and vinyl alcohol units is determined by the method according to JIS K 6726 (1994), it is necessary to calculate the degree of saponification by assigning the average molecular weight of the PVA determined by taking into account not only the vinyl ester monomer units and vinyl alcohol units but also the other repeating units, to the term of the average molecular weight of the equation for calculating the degree of saponification according to JIS K 6726 (1994). The degree of saponification determined by this method is almost equal to that determined by $^1$H-NMR spectroscopy.

It is important that the viscosity average degree of polymerization (P) of PVA(A) used in the present invention be 100 or more. When the viscosity average degree of polymerization (P) of PVA(A) is less than 100, the polymerization stability in suspension polymerization of a vinyl compound decreases, which causes various problems such that vinyl resin particles obtained by suspension polymerization are coarse, and particles having a uniform particle size cannot be obtained. The viscosity average degree of polymerization (P) of PVA(A) is preferably 110 or more, more preferably 120 or more, even more preferably 150 or more, and most preferably 180 or more. On the other hand, it is also important that the viscosity average degree of polymerization (P) of PVA(A) be 480 or less. When the viscosity average degree of polymerization (P) of PVA(A) is more than 480, it is difficult to remove monomer components from vinyl resin particles obtained by suspension polymerization of a vinyl compound, the plasticizer absorptivity of the resulting vinyl resin particles decreases, and PVA(A) has a very high viscosity when it is provided in the form of a high-concentration aqueous liquid and thus has poorer handleability. The viscosity average degree of polymerization (P) of PVA(A) is preferably 400 or less, more preferably 370 or less, and even more preferably 320 or less.

The viscosity average degree of polymerization (P) of PVA(A) can be calculated using Nakajima's equation (Akio Nakajima, "Kobunshi-Kagaku" (Polymer Science) 6 (1949)) from the limiting viscosity of an acetone solution of a vinyl ester polymer produced by substantially completely saponifying a PVA, followed by acetylation.

It is important that the block character of residual ester groups in PVA(A) be 0.5 or more to provide PVA(A) in the form of a low-viscosity and high-concentration aqueous liquid. A PVA having a block character of less than 0.5 has problems such that an aqueous liquid of the PVA cannot be formed due to its low water solubility or even if a high-concentration aqueous liquid can be formed, its handleability is poor due to its too high viscosity. The block character is preferably 0.56 or more, and more preferably 0.6 or more.

The term "block character" mentioned above denotes a value representing the distribution of the residual ester groups and hydroxyl groups that have replaced ester groups during saponification thereof, and the value is between 0 and 2. The value "0" indicates that all the residual ester groups or hydroxyl groups are distributed in blocks. As the value increases, alternation between these groups increases. Then, the value "1" indicates that the residual ester groups and hydroxyl groups are present completely at random, and the value "2" indicates that the residual ester groups and hydroxyl groups are present completely alternately. The residual ester group refers to an ester group (—O—C(=O)—Y (where Y is a hydrocarbon group other than $CH_2$=CH—O—C(=O)) contained in the vinyl ester monomer) contained in the vinyl ester monomer unit in the vinyl alcohol polymer (A) obtained by saponification. The block character can be determined by $^{13}$C-NMR spectroscopy. When PVA(A) further contains a repeating unit other than the vinyl ester monomer unit and/or the vinyl alcohol unit, the block character is calculated using all the sequences of vinyl ester monomer units and/or vinyl alcohol units.

The block character mentioned above can be adjusted according to the type of the vinyl ester monomer, the saponification conditions such as a catalyst and a solvent, heat treatment after the saponification, etc. More specifically, when an acid catalyst is used for saponification, the value of the block character can easily be increased. When a basic catalyst such as sodium hydroxide is used for saponification, the block character usually has a value of less than 0.5, but the value can be increased to 0.5 or more by the subsequent heat treatment.

It is important that in the dispersion stabilizer for suspension polymerization of the present invention, the relationship between the viscosity average degree of polymerization (P) of PVA(A) and the degree of modification (S) (mol %) of the aliphatic hydrocarbon group satisfy the following formula (1):

$$50 \leq S \times P/1.880 \leq 100 \quad (1)$$

In the above formula (1), the value represented by "S×P/1.880" shows the approximate rate of introduction of a chain transfer agent having an aliphatic hydrocarbon group in the synthesis of PVA(A). It is important that the "S×P/1.880" value be 50 or more. When the "S×P/1.880" value is less than 50, it is difficult to remove monomer components from the resulting vinyl resin particles and the plasticizer absorptivity of the resulting vinyl resin particles decreases, which means that the dispersion stabilizer is less effective. The "S×P/1.880" value is preferably 55 or more, and more preferably 60 or more.

It is also important that the "S×P/1.880" value be 100 or less because it is difficult to synthesize PVA(A) having a "S×P/1.880" value of more than 100. In chain transfer polymerization, the main reaction is a reaction in which a chain transfer agent is introduced into one terminal of the resulting PVA(A). Therefore, in order to achieve the "S×P/1.880" value of more than 100, it is necessary, for example, to perform a special operation or add a special catalyst to promote bimolecular termination in the polymerization process for producing PVA(A) so as to increase the probability of formation of PVA(A) into which two or more aliphatic hydrocarbon groups are introduced. It is further necessary to perform an operation of significantly reducing the polymerization conversion rate or significantly reducing the ratio of a solvent used for the polymerization to vinyl ester monomers such as vinyl acetate so as to inhibit a side reaction in which the solvent is introduced into one terminal of PVA(A). Performing such an operation leads to problems such as higher cost, lower productivity, and uncontrolled quality, and is therefore impractical. Thus, it is preferable that the "S×P/1.880" value be less than 100.

In the above formula (1), the viscosity average degree of polymerization (P) is divided by 1.880 to convert the viscosity average degree of polymerization (P) to the number average degree of polymerization (Pn). In the radical polymerization step in the synthesis of PVA(A), when the ratio of the number average degree of polymerization (Pn) to the weight average degree of polymerization (Pw) (Pn/Pw) is 1/2 assuming that the polymerization proceeds ideally, the relationship between the number average degree of polymerization (Pn) and the viscosity average degree of polymerization (P) can be determined by Mark-Houwink-Sakurada equation: $[\eta]=KM^\alpha$, where $[\eta]$ is the limiting viscosity of a polymer, M is the molecular weight thereof, and K and α are constants. In this equation, 0.74, that is the α value of polyvinyl acetate in acetone, is used to calculate the ratio of the viscosity average degree of polymerization (P) to the number average degree of polymerization (Pn) (P/Pn). Thus, the ratio of 1.880 is obtained. This ratio is combined with the degree of modification (S) (mol %) of aliphatic hydrocarbon groups to derive an equation representing the approximate rate of introduction of a chain transfer agent having aliphatic hydrocarbon groups in the synthesis of PVA(A) (see Takayuki Otsu: "Kaitei Kobunshi Gosei No Kagaku" (The Chemistry of Polymer Synthesis, revised edition), 11 (1979), and Akio Nakajima, "Kobunshi-Kagaku" (Polymer Science) 6 (1949), The Society of Polymer Science: "Kobunshi Kagaku Jikkenhou" (Experimental Methods in Polymer Science)).

The degree of modification (S) (mol %) of the aliphatic hydrocarbonl groups described above refer to the molar percentage of the aliphatic hydrocarbon groups in all the repeating units of PVA(A), and can be determined by $^1$H-NMR spectroscopy. For example, the degree of modification can be calculated from the integrated value of the characteristic proton peak of each repeating unit of PVA(A) and the integrated value of the characteristic proton peak of the terminal aliphatic hydrocarbon group, which are observed in the obtained $^1$H-NMR spectrum. The characteristic peak as used herein refers to a peak that does not overlap another peak, or a peak with an integrated value that can be calculated based on the relationship with another peak, if it overlaps the other peak. The numerical values in the above formula (1) can be adjusted according to the type and amount of the vinyl ester monomer, the type and amount of the chain transfer agent, the polymerization conditions such as a catalyst and a solvent, etc.

The production method of PVA(A) is not particularly limited, and various methods can be used. Examples of the production method include: (i) a method in which a vinyl ester monomer is polymerized in the presence of a chain transfer agent having an aliphatic hydrocarbon group having 6 to 12 carbon atoms to obtain a vinyl ester polymer and then the vinyl ester polymer is partially saponified; and (ii) a method in which a functional group is introduced to the terminal of a partially saponified PVA so as to react the functional group at the terminal with a compound having a group reactive with the functional group and an aliphatic hydrocarbon group having 6 to 12 carbon atoms. Among these methods, the method (i) is preferred because an aliphatic hydrocarbon group can be introduced more economically and efficiently. In particular, it is preferable to use a method in which a vinyl ester such as vinyl acetate is polymerized in the presence of alkylthiol as a chain transfer agent to obtain a vinyl ester polymer and then the vinyl ester polymer is partially saponified (see JP 57(1982)-28121 A and JP 57(1982)-105410 A).

Examples of the vinyl ester monomer used in the production of PVA(A) include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among these, vinyl acetate is most preferred.

In the synthesis of PVA(A), the vinyl ester monomer can be copolymerized with a copolymerizable comonomer, without departing from the scope of the present invention. Examples of the monomer that can be used as a comonomer include: α-olefins such as ethylene, propylene, n-butene, and isobutylene; acrylic acid and salts thereof, acrylamide; acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, and N-methylolacrylamide and derivatives thereof methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, 2,3-diacetoxy-1- vinyloxypropane; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts or esters thereof; vinylsilyl compounds such as vinyltrimethoxysilane; and isopropenyl acetate. The amount of copolymerized comonomers copolymerizable with such vinyl ester monomers is usually 10 mol % or less.

Examples of the chain transfer agent having an aliphatic hydrocarbon group having 6 to 12 carbon atoms include alcohol, aldehyde, and thiol or the like, each having an aliphatic hydrocarbon group having a 6 to 12 carbon atoms. Alkylthiol having 6 to 12 carbon atoms is preferably used. Examples of the alkylthiol having 6 to 12 carbon atoms include n-hexanethiol, cyclohexanethiol, adamantanethiol, n-heptanethiol, n-octanethiol, n-nonanethiol, n-decanethiol, n-undecanethiol, n-dodecanethiol, and t-dodecanethiol.

In the synthesis of PVA(A), the temperature at which a vinyl ester monomer is polymerized in the presence of a chain transfer agent is not particularly limited. The temperature is preferably 0° C. or higher and 200° C. or lower, and more preferably 30° C. or higher and 140° C. or lower. The polymerization temperature at lower than 0° C. is undesirable because the polymerization does not proceed at a sufficiently high rate. When the polymerization temperature is higher than 200° C., it is difficult to obtain a desired polymer. The temperature for the polymerization is controlled to 0° C. or higher and 200° C. or lower, for example, by a method of controlling the polymerization rate so as to achieve a balance between the heat generated by the polymerization and the heat released from the surface of a reactor, or a method of using an external jacket with an appropriate heat medium to control the polymerization temperature. The latter method is preferred in terms of safety.

The polymerization described above can be conducted by any of the polymerization processes such as batch polymerization, semi-batch polymerization, continuous polymerization, and semi-continuous polymerization. The polymerization can be conducted by any of the known polymerization methods such as bulk polymerization, solution polymerization, suspension polymerization, and emulsion polymerization. Among these, bulk polymerization in which polymerization is conducted under solvent-free conditions or solution polymerization in which polymerization is conducted in the presence of an alcoholic solvent is suitably used. In order to produce a polymer having a high degree of polymerization, emulsion polymerization is used. Examples of the alcoholic solvent used for solution polymerization include, but not limited to, methanol, ethanol, and n-propanol. Two or more of these solvents may be used in combination.

An initiator used for the polymerization can be appropriately selected from conventionally known azo initiators, peroxide initiators, redox initiators, etc. depending on the polymerization method. Examples of azo initiators include 2,2'-azobisisobutyronitrile, 2,2'-azobis(2,4-dimethylvaleronitrile), and 2,2'-azobis(4-methoxy-2,4-dimethylvaleronitrile). Examples of peroxide initiators include: percarbonate compounds such as diisopropyl peroxydicarbonate, di-2-ethylhexyl peroxydicarbonate, and diethoxyethyl peroxydicarbonate; perester compounds such as t-butyl peroxyneodecanoate, α-cumyl peroxyneodecanoate, and t-butyl peroxydecanoate; acetylcyclohexylsulfonyl peroxide; and 2,4,4-trimethylpentyl-2-peroxyphenoxy acetate. Furthermore, any of the above-mentioned initiators can be combined with, for example, potassium persulfate, ammonium persulfate, or hydrogen peroxide, to be used as an initiator. Examples of redox initiators include combinations of any of the above-mentioned peroxides with a reducing agent such as sodium bisulfite, sodium bicarbonate, tartaric acid, L-ascorbic acid, or Rongalite.

When the polymerization is conducted at high temperatures, PVA may be stained due to decomposition of a vinyl ester monomer. In such a case, an antioxidizing agent such as tartaric acid in an amount of about 1 ppm or more and 100 ppm or less relative to the mass of the vinyl ester monomers may be added to the polymerization system to protect the PVA from being stained.

For the purpose of adjusting the degree of polymerization of a vinyl ester polymer obtained by the polymerization, the polymerization may be conducted in the presence of another chain transfer agent without departing from the scope of the present invention. Examples of the chain transfer agent include: aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; and phosphinates such as sodium phosphinate monohydrate. Among these, aldehydes and ketones are suitably used. The amount of the chain transfer agent to be added may be determined according to the chain transfer constant of the chain transfer agent to be added and the target degree of polymerization of the vinyl ester polymer. Generally, the amount is desirably 0.1 mass % or more and 10 mass % or less with respect to the vinyl ester monomers.

Any type of stirring blade can be used for the polymerization without any limitation. Examples of the stirring blade include anchor blades, paddle blades and Maxblend blades. A Maxblend blade can improve the stirring efficiency, so that the ratio of the weight average molecular weight (Mw) of the resulting vinyl ester polymer to the number average molecular weight (Mn) thereof (Mw/Mn) can be reduced. This means that the use of a Maxblend blade is preferred because it makes it possible to obtain a vinyl ester polymer with a narrower molecular weight distribution and thus to improve the effect of the dispersion stabilizer for suspension polymerization of the present invention.

An alcoholysis or hydrolysis reaction using a conventionally known basic catalyst such as sodium hydroxide, potassium hydroxide, or sodium methoxide, or a conventionally known acid catalyst such as p-toluenesulfonic acid, hydrochloric acid, sulfuric acid, or nitric acid can be used for the saponification reaction of the vinyl ester polymer. Examples of the solvent to be used for this reaction include: water; alcohols such as methanol and ethanol; esters such as methyl acetate and ethyl acetate; ketones such as acetone and methyl ethyl ketone; and aromatic hydrocarbons such as benzene and toluene. These solvents can be used alone or in combination of two or more thereof. In particular, it is preferable to carry out the saponification reaction using, as a solvent, methanol, a methanol/methyl acetate mixed solution, or water, and, as a catalyst, an acid catalyst such as p-toluenesulfonic acid, hydrochloric acid, sulfuric acid, or nitric acid because such a saponification reaction can easily increase the block character. The concentration of the vinyl ester polymer in alcohol is not particularly limited but can be selected within a range of 10 to 80 mass %. The amount of alkali or acid used is adjusted according to the target degree of saponification. The amount of alkali or acid is preferably 1 to 100 mmol equivalent to the vinyl ester polymer, in terms of preventing staining of PVA and minimizing the amount of acetic acid, sodium acetate, or a by-product derived from the catalyst. In the saponification, when the functional group introduced to the vinyl ester polymer consumes a saponification catalyst, the amount of the catalyst to be added may be increased from the above range to compensate the consumption for the saponification. The saponification temperature is not particularly limited, and it is in a range of 10° C. to 100° C., and preferably 20° C. to 80° C. When the saponification reaction is conducted using acid, the rate of reaction may be lower than that of a reaction using alkali. Therefore, the saponification may be conducted at a higher temperature than that using alkali. The reaction time is not particularly limited, and it is about 30 minutes to 5 hours.

When the saponification reaction is carried out using a basic catalyst, the value of the block character is less than 0.5 and thus heat treatment needs to be performed after the saponification. The heat treatment is performed at a heat treatment temperature of usually 60° C. to 200° C., preferably 80° C. to 160° C., and for a heat treatment time of usually 5 minutes to 20 hours, preferably 30 minutes to 15 hours.

The dispersion stabilizer for suspension polymerization of the present invention is in the form of an aqueous liquid. Therefore, it contains water. It is important that the concentration of PVA(A) in the aqueous liquid be 20 mass % or more and 50 mass % or less. When the concentration is less than 20 mass %, the economic efficiency decreases or the stability of the aqueous liquid decreases and precipitation is likely to occur. The concentration of PVA(A) is preferably 26 mass % or more, and more preferably 31 mass % or more. When the concentration is more than 50 mass %, the viscosity increases while the handleability decreases. As used in the present invention, the aqueous liquid refers to an aqueous solution or a water dispersion. A water dispersion refers to a mixture of water and components other than water that are uniformly dispersed in water without precipitation or phase separation.

The method for preparing PVA(A) in the form of a high-concentration aqueous liquid is not particularly limited. Any of the following methods can be used: a method in which a vinyl ester polymer is saponified, the resulting PVA(A) is dried once, and then water is added to dissolve or disperse PVA(A) in water; and a method in which after the saponification, a saponification solvent is replaced by water by blowing steam into the resulting PVA(A) or adding water thereto, followed by heating.

When PVA(A) is prepared in the form of a high-concentration aqueous liquid, a small amount of nonionic, cationic, or anionic surfactant may be added, without departing from the scope of the present invention.

[PVA(B)]

Preferably, the dispersion stabilizer for suspension polymerization of the present invention further contains, in addition to PVA(A) described above, PVA(B) having a degree of saponification of more than 65 mol % and a viscosity average degree of polymerization of more than 480. Further addition of PVA(B) having a higher degree of saponification and a higher viscosity average degree of polymerization than PVA(A) makes it possible to further improve the polymerization stability and to further prevent formation of coarse particles.

The degree of saponification of PVA(B) used in the present invention is more than 65 mol %, preferably more than 65 mol % and 95 mol % or less, and more preferably 68 mol % or more and 90 mol % or less. When the degree of saponification of PVA(B) is 65 mol % or less, the water-solubility of PVA(B) decreases, which may lead to poorer handleability. In addition, the polymerization stability decreases, which may lead to formation of coarse vinyl resin particles. The degree of saponification of PVA(B) can be determined according to JIS K 6726 (1994).

The viscosity average degree of polymerization of PVA (B) is more than 480, preferably 500 or more and 8000 or less, and more preferably 600 or more and 3500 or less. When the viscosity average degree of polymerization of PVA(B) is 480 or less, the polymerization stability in suspension polymerization of a vinyl compound may decrease. The viscosity average degree of polymerization of PVA(B) can be determined in the same manner as for PVA(A) described above, and it can also be determined according to JIS K 6726 (1994).

One type of PVA(B) may be used alone, or two or more types of PVA(B) having different properties may be used in combination.

The mass ratio between PVA(A) and PVA(B) used ([PVA (A)]/[PVA(B)]) is preferably 10/90 to 55/45, and more preferably 15/85 to 50/50, in terms of solid content ratio. When the solid content ratio is lower than 10/90, the effect of the dispersion stabilizer may be reduced. For example, it may be difficult to remove monomer components from vinyl resin particles obtained by suspension polymerization of a vinyl compound, or the plasticizer absorptivity of the resulting vinyl resin particles may decrease. On the other hand, when the solid content ratio is higher than 55/45, the polymerization stability in suspension polymerization of a vinyl compound decreases, which may cause problems such that vinyl resin particles obtained by suspension polymerization are coarse, and particles having a uniform particle size cannot be obtained.

When the dispersion stabilizer for suspension polymerization of the present invention contains PVA(B), it may be a product in the form of an aqueous PVA(A) liquid containing a solid PVA(B) or an aqueous PVA(B) liquid, or a two-component product consisting of an aqueous PVA(A) liquid and a solid PVA(B) or an aqueous PVA(B) liquid, which are separately packaged.

[Other Components]

The dispersion stabilizer for suspension polymerization of the present invention may further contain a PVA other than PVA(A) and PVA(B) described above, without departing from the scope of the present invention. For example, the dispersion stabilizer of the present invention may contain a PVA having a degree of saponification of 35 mol % or more and 65 mol % or less, a viscosity average degree of polymerization of 100 or more and 480 or less, a block character of residual ester groups of 0.5 or more, and no terminal aliphatic hydrocarbon group having 6 to 12 carbon atoms. This PVA can be produced when an aliphatic hydrocarbon group in a chain transfer agent is not introduced to the terminal of the PVA during the synthesis of PVA(A).

The dispersion stabilizer for suspension polymerization of the present invention may further contain other additives, without departing from the scope of the present invention. Examples of the additives include: polymerization regulators such as aldehydes, halogenated hydrocarbons, and mercaptans; polymerizaion inhibitors such as phenol compounds, sulfur compounds, N-oxide compounds; pH adjusters; cross-linking agents; preservatives; mildewcides; antiblocking agents; antifoaming agents; and compatibilizing agents.

[Intended Use (Method for Producing Vinyl Resin)]

The dispersion stabilizer for suspension polymerization of the present invention is used for suspension polymerization of vinyl compounds. In another aspect, the present invention is a method for producing a vinyl resin, including conducting suspension polymerization of a vinyl compound in the presence of the above-mentioned dispersion stabilizer for suspension polymerization.

Examples of the vinyl compound include: vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; styrene, acrylonitrile, vinylidene chloride, and vinyl ethers. Among these, vinyl chloride is preferred. A combination of vinyl chloride and a monomer copolymerizable with vinyl chloride is also preferred. Examples of the monomer copolymerizable with vinyl chloride include: vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile, styrene, vinylidene chloride, and vinyl ethers.

For suspension polymerization of a vinyl compound, an oil-soluble or water-soluble polymerization initiator, which is conventionally used for polymerization of vinyl chloride or the like, can be used. Examples of the oil-soluble polymerization initiator include: percarbonate compounds such as diisopropyl peroxydicarbonate, di-2-ethylhexyl peroxydicarbonate, and diethoxyethyl peroxydicarbonate; perester compounds such as t-butyl peroxyneodecanoate, t-butylperoxypivalate, t-hexyl peroxypivalate, and α-cumyl peroxyneodecanoate; peroxides such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile and azobis(4-2,4-dimethylvaleronitrile). Examples of the water-soluble polymerization initiator include potassium persulfate, ammonium persulfate, hydrogen peroxide, and cumene hydroperoxide. These oil-soluble or water-soluble polymerization initiators can be used alone or in combination of two or more thereof.

In suspension polymerization of a vinyl compound, the polymerization temperature is not particularly limited and can be adjusted to not only a lower temperature of about 20° C. but also a higher temperature exceeding 90° C. Furthermore, in one of the preferred embodiments, a polymerizer equipped with a reflux condenser is used in order to increase the heat removal efficiency of the polymerization reaction system.

When a vinyl resin is produced using the above-mentioned dispersion stabilizer for suspension polymerization, the dispersion stabilizer is highly effective in removing monomer components from the resulting vinyl resin, regardless of the polymerization temperature. It is particularly effective and thus preferable to use the above-mentioned dispersion stabilizer when the suspension polymerization is conducted at a polymerization temperature of 60° C. or higher at which it is difficult to remove the residual monomer components in the vinyl resin, rather than when the suspension polymerization is conducted at a polymerization temperature of lower than 60° C. at which it is relatively easy to remove the residual monomer components in the vinyl resin.

In suspension polymerization of the vinyl compound, the above-mentioned dispersion stabilizer for suspension polymerization may be used alone or in combination with any of the following: water-soluble cellulose ethers such as methylcellulose, hydroxyethylcellulose, hydroxypropylcellulose, and hydroxypropyl methylcellulose; water-soluble polymers such as gelatin; oil-soluble emulsifiers such as sorbitan monolaurate, sorbitan trioleate, glycerol tristearate, and ethylene oxide/propylene oxide block copolymer; and water-soluble emulsifiers such as polyoxyethylene sorbitan monolaurate, polyoxyethylene glycerol oleate, and sodium laurate, which are used commonly in suspension polymerization of a vinyl compound in an aqueous medium. The amount thereof is not particularly limited, and is preferably 0.01 part by mass or more and 1.0 part by mass or less per 100 parts by mass of the vinyl compound.

There is no particular limitation on how to charge the above-mentioned dispersion stabilizer for suspension polymerization into a polymerization vessel to conduct suspension polymerization of a vinyl compound. For example, when the above-mentioned dispersion stabilizer for suspension polymerization contains PVA(B), a mixture of PVA(A) and PVA(B) may be charged into the vessel. PVA(A) and PVA(B) may be charged separately into the vessel. For example, PVA(A) and PVA(B) may be charged separately into the vessel before the start of the polymerization. It is also possible to charge PVA(A) before the start of the polymerization and then charge PVA(B) after the start of the polymerization.

When the above-mentioned dispersion stabilizer for suspension polymerization is charged into the polymerization vessel, the stabilizer itself without any organic solvent such as methanol added or the stabilizer diluted with water is poured into the polymerization vessel, in terms of handleability and environmental impact. Preferably, PVA(B) is charged in the form of an aqueous solution or a water dispersion.

In the suspension polymerization of a vinyl compound, the ratio of the vinyl compound to be charged to water is not particularly limited. As the ratio of the vinyl compound to water decreases, the polymerization stability increases but the productivity decreases. On the other hand, as the ratio of the vinyl compound to water increases, the productivity increases but the polymerization stability decreases. Generally, the mass ratio of the vinyl compound to water ([vinyl compound]/[water]) is 4/7 to 5/4. When the ratio is less than 4/7, the productivity of the resulting vinyl resin is low. On the other hand, a ratio of more than 5/4 is undesirable because the polymerization stability significantly decreases, which may lead to formation of coarse vinyl resin particles or increased formation of fish eyes in the resulting product. However, the use of the above-mentioned dispersion stabilizer for suspension polymerization allows the polymerization to proceed stably even under the polymerization conditions where the ratio of the vinyl compound to water is high and the polymerization is likely to be unstable, more specifically, under the polymerization conditions where the mass ratio ([vinyl compound]/[water]) is higher than 3/4. Thus, the mass ratio ([vinyl compound]/[water]) is preferably higher than 3/4 because such a ratio is more effective in preventing formation of coarse vinyl polymer particles. On the other hand, the mass ratio ([vinyl compound]/[water]) is preferably lower than 10/9.

Since the dispersion stabilizer for suspension polymerization of the present invention is in the form of a low-viscosity and high-concentration aqueous liquid, it has good handleability. In addition, since the dispersion stabilizer for suspension polymerization of the present invention eliminates the need to use an organic solvent such as methanol, it is less environmentally harmful and is more economically efficient. When suspension polymerization of a vinyl compound is conducted in the presence of the dispersion stabilizer for suspension polymerization of the present invention, fewer coarse particles are formed due to high polymerization stability, and the resulting vinyl resin particles have a uniform particle size. Furthermore, even if the amount of the dispersion stabilizer for suspension polymerization of the present invention used is small, the resulting vinyl resin particles have high plasticizer absorptivity and are easy to work with. In addition, the rate of removing residual monomer compounds from vinyl resin particles per unit time is high, and the resulting vinyl resin particles have high monomer removability. The resulting particles can be used for formation of various molded products by adding additives such as a plasticizer, as needed.

EXAMPLES

Hereinafter, the present invention will be described in more detail with reference to examples, but the present invention is not intended to be limited to these examples. In the following examples and comparative examples, "part(s)" and "%" denote "part(s) by mass" and "% by mass (mass %)", respectively, unless otherwise specified.

The PVAs obtained in the following production examples were evaluated by the following methods.

[Viscosity Average Degree of Polymerization of PVA]

The viscosity average degree of polymerization of each PVA was calculated using Nakajima's equation (Akio Nakajima, "Kobunshi-Kagaku" (Polymer Science) 6 (1949)) from the limiting viscosity of an acetone solution of a vinyl ester polymer produced by substantially completely saponifying a PVA, followed by acetylation.

[Degree of Saponification of PVA]

The degree of saponification of each PVA was determined according to JIS K 6726 (1994). In the case of a PVA copolymerized with an unsaturated monomer, its degree of saponification was calculated with a correction to be made with the average molecular weight obtained by taking into account the copolymerized, unsaturated monomer units, in the equation for calculating the degree of saponification according to JIS K 6726 (1994).

[Block Character of PVA]

The block character of residual ester groups in each PVA was determined in the following manner. The PVA was dissolved in deuterated water/deuterated methanol mixture solvent to obtain a sample. The sample was subjected to $^{13}$C-NMR spectroscopy at a measurement temperature of 70° C. and 18000 scans were accumulated. Then, three peaks in the dyad present in the methylene region were analyzed so as to calculate the block character from the integrated values of these peaks. The three peaks correspond to: a peak of methylene carbon sandwiched between a carbon atom in the main chain bonded to a residual ester group (—O—C(=O)—Y, where Y is a hydrocarbon group as defined above) and another carbon atom in the main chain bonded to a hydroxyl group; a peak of methylene carbon sandwiched between a carbon atom in the main chain bonded to a residual ester group and another carbon atom in the main chain held close to the carbon atom and bonded to another residual ester group; and a peak of methylene carbon sandwiched between a carbon atom in the main chain bonded to a hydroxyl group and another carbon atom in the main chain held close to the carbon atom and bonded to another hydroxyl group. The $^{13}$C-NMR spectroscopy and the calculation of the block character are described in "Poval" (Kobunshi Kanko Kai, published in 1984, pp. 246 to 249) and Macromolecules, 10, 532 (1977).

[S×P/1.88 Value]

The value of the viscosity average degree of polymerization of each PVA subjected to $^{13}$C-NMR was used as the value of "P". $^1$H-NMR spectroscopy was used to determine the value of "S" in terms of the molar percentage (mol %) of aliphatic hydrocarbon groups in all the repeating units of the PVA. Specifically, the value of "S" was determined using the ratio between the area of all the peaks arising from protons of main chain methine of each repeating unit of the PVA and the area of the peaks arising from protons of terminal methyl of aliphatic hydrocarbon, taking into account the number of protons. The value of S×P/1.880 was calculated using the P and S values thus determined.

[Stability of Aqueous Liquid]

Each PVA was dissolved in water and then allowed to stand at 25° C. for one day. Whether precipitation occurred or not was visually examined to evaluate the stability according to the following criteria:

A: Transparent solution with no precipitation observed
B: Precipitation or phase separation observed
C: Not dissolved in water and remained phase-separated

[Viscosity of Dispersion Stabilizer for Suspension Polymerization]

The value of the viscosity of the dispersion stabilizer for suspension polymerization in the form of an aqueous liquid was measured at 20° C. using a B-type viscometer.

<10000 mPa: having good fluidity
10000 to 15000 mPa: having fluidity
>15000 mPa: having poor fluidity Production Example 1

Production of Dispersion Stabilizer for Suspension Polymerization: PVA(A1)

Into a polymerization can were charged 1404 parts of vinyl acetate (hereinafter abbreviated as "VAc"), 396 parts of methanol, and 0.54 parts of n-dodecanethiol (hereinafter abbreviated as "DDM"). After the air in the can was replaced by nitrogen, the mixture was heated to its boiling point and then 2,2'-azobisisobutyronitrile in an amount of 0.15% relative to VAc and 10 parts of methanol were added. Then, the addition of a room-temperature methanol solution of DDM (a concentration of 5 wt. %) into the polymerization can was immediately started, and the addition of the methanol solution of DDM was continued to keep the concentration of DDM in the polymerization can constant with respect to VAc. The polymerization was thus conducted. Once the polymerization conversion rate reached 70%, the polymerization was stopped. While adding methanol, an operation of removing residual VAc together with methanol from the system was performed under a reduced pressure. Thus, a methanol solution of polyvinyl acetate (hereinafter abbreviated as "PVAc") (a concentration of 75%) was obtained. Next, PVAc in a methanol solvent was saponified for 3 hours under the conditions of a PVAc concentration of 30%, a temperature of 60° C., and a water content of 1% in the saponification solution using p-toluenesulfonic acid as a saponification catalyst added at a molar ratio of 0.027 with respect to PVAc. Sodium bicarbonate was added at a molar ratio 1.15 times that of an acid catalyst to neutralize the resulting solution, followed by drying. Thus, a PVA having a viscosity average degree of polymerization of 250, a degree of saponification of 54 mol %, a block character of 0.739, and a "S×P/1.88" value of 77 in the formula (1) was obtained. After the drying, water was added to obtain a dispersion stabilizer for suspension polymerization: PVA (A1) having a solid content concentration of 40 wt. % and a viscosity of 6000 mPa·s.

Production Examples 2 to 12 and 17 to 26

Production of PVA(A2) to PVA(A12) and PVA(A17) to PVA(A26)

Dispersion stabilizers for suspension polymerization: PVA(A2) to PVA(A12) and PVA(A17) to PVA(A26) shown in Table 2 were produced in the same manner as in Production Example 1, except that the amounts of vinyl acetate and methanol charged, the type, amount, and concentration of a chain transfer agent having an aliphatic hydrocarbon group used in polymerization, the polymerization conditions such as the amount of an initiator used and the target polymerization conversion rate, the saponification conditions, and the concentration of the aqueous liquid were changed. Tables 1, 3 and 5 show the production conditions, the types of the chain transfer agents used, and the saponification conditions, respectively.

Production Examples 13 to 15

Production of PVA(A13) to PVA(A15)

Dispersion stabilizers for suspension polymerization: PVA(A13) to PVA(A15) shown in Table 2 were produced in the same manner as in Production Example 1, except that the type, amount, and concentration of a chain transfer agent having an aliphatic hydrocarbon group used in polymerization and the polymerization conditions such as the amount of an initiator used were changed and that an unsaturated monomer to be copolymerized was previously charged and the polymerization was conducted while continuously adding a methanol solution of the unsaturated monomer so as to keep the concentration of the unsaturated monomer to be copolymerized constant with respect to VAc after the start of the polymerization. Tables 1, 3 and 4 show the production conditions, the types of the chain transfer agents used, and the unsaturated monomers used, respectively.

Production Example 16

Production of PVA(A16)

The PVA of Production Example 23 was heat-treated under a nitrogen atmosphere at 130° C. for 10 hours, and then water was added to obtain a 40 wt. % aqueous liquid. Thus, a dispersion stabilizer for suspension polymerization: PVA(A16) shown in Table 2 was obtained.

Production Example 27

Production of PVA(a)

A dispersion stabilizer for suspension polymerization: PVA(a) shown in Table 2 was produced in the same manner as in Production Example 1, except that the amounts of vinyl acetate and methanol charged were changed, that a chain transfer agent having an aliphatic hydrocarbon group was not used in polymerization, and that the polymerization conditions such as the amount of an initiator used were changed. Table 1 shows the production conditions.

TABLE 1

| | Dispersion stabilizer for suspension polymerization | Polymerization | | | | | | |
|---|---|---|---|---|---|---|---|---|
| | | Vinyl acetate (Parts) | Methanol (Parts) | Chain transfer agent having aliphatic hydrocarbon group | | | Unsaturated monomer to be copolymerized | | |
| | | | | Type | Initial charge (Parts) | Addition (Parts) | Type | Initial charge (Parts) | Addition (Parts) |
| Pro. Ex. 1 | PVA(A1) | 1404 | 396 | A | 0.54 | 13.09 | — | — | — |
| Pro. Ex. 2 | PVA(A2) | 1404 | 396 | B | 0.39 | 9.46 | — | — | — |
| Pro. Ex. 3 | PVA(A3) | 1404 | 396 | B | 0.39 | 9.46 | — | — | — |
| Pro. Ex. 4 | PVA(A4) | 1404 | 396 | B | 0.39 | 9.46 | — | — | — |
| Pro. Ex. 5 | PVA(A5) | 1440 | 360 | B | 0.27 | 6.21 | — | — | — |
| Pro. Ex. 6 | PVA(A6) | 1260 | 540 | B | 0.60 | 16.70 | — | — | — |
| Pro. Ex. 7 | PVA(A7) | 1404 | 396 | B | 0.39 | 9.46 | — | — | — |
| Pro. Ex. 8 | PVA(A8) | 1404 | 396 | B | 0.39 | 9.46 | — | — | — |
| Pro. Ex. 9 | PVA(A9) | 1404 | 396 | B | 0.39 | 9.46 | — | — | — |
| Pro. Ex. 10 | PVA(A10) | 1530 | 270 | B | 0.75 | 19.46 | — | — | — |
| Pro. Ex. 11 | PVA(A11) | 1206 | 594 | B | 0.20 | 4.09 | — | — | — |
| Pro. Ex. 12 | PVA(A12) | 1404 | 396 | B | 0.39 | 9.46 | — | — | — |
| Pro. Ex. 13 | PVA(A13) | 1404 | 396 | A | 0.54 | 13.02 | A | 0.15 | 3.66 |
| Pro. Ex. 14 | PVA(A14) | 1404 | 396 | B | 0.39 | 9.41 | B | 0.06 | 1.45 |
| Pro. Ex. 15 | PVA(A15) | 1404 | 396 | B | 0.39 | 9.36 | C | 0.29 | 2.03 |
| Pro. Ex. 16 | PVA(A16) | 1404 | 396 | B | 0.39 | 9.46 | — | — | — |
| Pro. Ex. 17 | PVA(A17) | 1386 | 414 | C | 0.24 | 5.76 | — | — | — |
| Pro. Ex. 18 | PVA(A18) | 1386 | 414 | D | 0.24 | 5.76 | — | — | — |
| Pro. Ex. 19 | PVA(A19) | 1404 | 396 | B | 0.39 | 9.46 | — | — | — |
| Pro. Ex. 20 | PVA(A20) | 1404 | 396 | B | 0.39 | 9.46 | — | — | — |
| Pro. Ex. 21 | PVA(A21) | 1584 | 216 | B | 0.20 | 4.47 | — | — | — |
| Pro. Ex. 22 | PVA(A22) | 900 | 900 | B | 0.80 | 22.59 | — | — | — |
| Pro. Ex. 23 | PVA(A23) | 1404 | 396 | B | 0.39 | 9.46 | — | — | — |
| Pro. Ex. 24 | PVA(A24) | 1404 | 396 | B | 0.39 | 9.46 | — | — | — |
| Pro. Ex. 25 | PVA(A25) | 1404 | 396 | B | 0.39 | 9.46 | — | — | — |
| Pro. Ex. 26 | PVA(A26) | 900 | 900 | B | 0.21 | 4.18 | — | — | — |
| Pro. Ex. 27 | PVA(a) | 450 | 1350 | — | — | — | — | — | — |

TABLE 1-continued

| | Polymerization | | Saponification conditions | | | |
|---|---|---|---|---|---|---|
| | Initiator (wt. %/ VAc) | Polymerization conversion rate (%) | Molar ratio of catalyst with respect to PVAc | Saponification conditions | Heat Treatment | Aqueous liquid Concentration (%) |
| Pro. Ex. 1 | 0.15 | 70 | 0.027 | A | x | 40 |
| Pro. Ex. 2 | 0.15 | 70 | 0.027 | A | x | 40 |
| Pro. Ex. 3 | 0.15 | 70 | 0.03 | A | x | 40 |
| Pro. Ex. 4 | 0.15 | 70 | 0.0245 | A | x | 40 |
| Pro. Ex. 5 | 0.15 | 70 | 0.0265 | A | x | 40 |
| Pro. Ex. 6 | 0.22 | 80 | 0.027 | A | x | 40 |
| Pro. Ex. 7 | 0.15 | 70 | 0.01 | B | x | 40 |
| Pro. Ex. 8 | 0.15 | 70 | 0.027 | A | x | 45 |
| Pro. Ex. 9 | 0.15 | 70 | 0.027 | A | x | 30 |
| Pro. Ex. 10 | 0.15 | 70 | 0.027 | A | x | 40 |
| Pro. Ex. 11 | 0.15 | 70 | 0.027 | A | x | 40 |
| Pro. Ex. 12 | 0.15 | 70 | 0.0255 | C | x | 40 |
| Pro. Ex. 13 | 0.2 | 70 | 0.027 | A | x | 40 |
| Pro. Ex. 14 | 0.2 | 70 | 0.027 | A | x | 40 |
| Pro. Ex. 15 | 0.2 | 70 | 0.027 | A | x | 40 |
| Pro. Ex. 16 | 0.15 | 70 | 0.003 | D | o | 40 |
| Pro. Ex. 17 | 0.15 | 70 | 0.027 | A | x | 40 |
| Pro. Ex. 18 | 0.15 | 70 | 0.027 | A | x | 40 |
| Pro. Ex. 19 | 0.15 | 70 | 0.017 | A | x | 40 |
| Pro. Ex. 20 | 0.15 | 70 | 0.04 | A | x | 40 |
| Pro. Ex. 21 | 0.15 | 70 | 0.027 | A | x | 40 |
| Pro. Ex. 22 | 0.4 | 80 | 0.028 | A | x | 40 |
| Pro. Ex. 23 | 0.15 | 70 | 0.003 | D | x | 40 |
| Pro. Ex. 24 | 0.15 | 70 | 0.027 | A | x | 55 |
| Pro. Ex. 25 | 0.15 | 70 | 0.027 | A | x | 15 |
| Pro. Ex. 26 | 0.45 | 85 | 0.028 | A | x | 40 |
| Pro. Ex. 27 | 0.6 | 70 | 0.027 | A | x | 40 |

TABLE 2

| | Dispersion stabilizer for suspension polymerization | Values of physical properties of polyvinyl alcohol polymer (A) | | | | | Aqueous PVA liquid | | |
|---|---|---|---|---|---|---|---|---|---|
| | | Degree of polymerization | Degree of saponification (mol %) | Degree of modification of copolymerizable comonomer (mol %) | Block character | Value of formula (1) | Concentration of aqueous liquid (wt. %) | Viscosity (mPa · s) | Stability of aqueous liquid |
| Pro. Ex. 1 | PVA(A1) | 250 | 54 | — | 0.739 | 77 | 40 | 6000 | A |
| Pro. Ex. 2 | PVA(A2) | 250 | 55 | — | 0.729 | 78 | 40 | 4400 | A |
| Pro. Ex. 3 | PVA(A3) | 250 | 62 | — | 0.717 | 78 | 40 | 3300 | A |
| Pro. Ex. 4 | PVA(A4) | 250 | 45 | — | 0.709 | 78 | 40 | 9600 | A |
| Pro. Ex. 5 | PVA(A5) | 390 | 53 | — | 0.704 | 74 | 40 | 9100 | A |
| Pro. Ex. 6 | PVA(A6) | 150 | 55 | — | 0.717 | 81 | 40 | 2100 | A |
| Pro. Ex. 7 | PVA(A7) | 250 | 55 | — | 0.583 | 78 | 40 | 9200 | A |
| Pro. Ex. 8 | PVA(A8) | 250 | 55 | — | 0.729 | 78 | 45 | 7000 | A |
| Pro. Ex. 9 | PVA(A9) | 250 | 55 | — | 0.729 | 78 | 30 | 800 | A |
| Pro. Ex. 10 | PVA(A10) | 150 | 56 | — | 0.715 | 93 | 40 | 4800 | A |
| Pro. Ex. 11 | PVA(A11) | 390 | 55 | — | 0.684 | 58 | 40 | 3500 | A |
| Pro. Ex. 12 | PVA(A12) | 250 | 57 | — | 0.695 | 78 | 40 | 4500 | A |
| Pro. Ex. 13 | PVA(A13) | 250 | 55 | 0.2 | 0.701 | 74 | 40 | 4400 | A |
| Pro. Ex. 14 | PVA(A14) | 250 | 56 | 0.1 | 0.710 | 77 | 40 | 5900 | A |
| Pro. Ex. 15 | PVA(A15) | 250 | 56 | 0.15 | 0.722 | 77 | 40 | 5100 | A |
| Pro. Ex. 16 | PVA(A16) | 250 | 58 | — | 0.558 | 78 | 40 | 9700 | A |
| Pro. Ex. 17 | PVA(A17) | 250 | 55 | — | 0.727 | 73 | 40 | 2600 | A |
| Pro. Ex. 18 | PVA(A18) | 250 | 50 | — | 0.678 | 75 | 40 | 20200 | A |
| Pro. Ex. 19 | PVA(A19) | 250 | 32 | — | 0.697 | 78 | 40 | — | C |
| Pro. Ex. 20 | PVA(A20) | 250 | 72 | — | 0.707 | 78 | 40 | 26000 | A |
| Pro. Ex. 21 | PVA(A21) | 520 | 55 | — | 0.704 | 70 | 40 | 30000 | A |
| Pro. Ex. 22 | PVA(A22) | 80 | 58 | — | 0.701 | 82 | 40 | 500 | A |
| Pro. Ex. 23 | PVA(A23) | 250 | 58 | — | 0.433 | 78 | 40 | 34000 | A |
| Pro. Ex. 24 | PVA(A24) | 250 | 55 | — | 0.729 | 78 | 55 | 39000 | A |
| Pro. Ex. 25 | PVA(A25) | 250 | 55 | — | 0.729 | 78 | 15 | — | B |
| Pro. Ex. 26 | PVA(A26) | 250 | 58 | — | 0.715 | 43 | 40 | 2000 | A |
| Pro. Ex. 27 | PVA(a) | 250 | 55 | — | 0.687 | — | 40 | 1700 | A |

TABLE 3

| Type | Chain transfer agent | Carbon number |
|------|---------------------|---------------|
| A | n-dodecanethiol | 12 |
| B | n-octanethiol | 8 |
| C | n-butanethiol | 4 |
| D | n-octadecanethiol | 18 |

TABLE 4

| Type | Unsaturated monomer |
|------|---------------------|
| A | Dimethyl itaconate |
| B | Itaconic acid |
| C | Maleic anhydride |

TABLE 5

| Conditions | Catalyst used | PVAc concentration (%) | Saponification system temperature (° C.) | Saponification system water content (%) | Saponification time (h) |
|---|---|---|---|---|---|
| A | p-toluenesulfonic acid | 30 | 60 | 1 | 3 |
| B | p-toluenesulfonic acid | 30 | 60 | 0.5 | 5 |
| C | Sulfuric acid | 30 | 60 | 1 | 3 |
| D | Sodium hydroxide | 40 | 40 | 1 | 1 |

Example 1

Into a 5-liter autoclave was charged PVA(B) having a viscosity average degree of polymerization of 2400 and a degree of saponification of 80 mol % in the form of 100 parts of a deionized aqueous solution to give a concentration of 1000 ppm with respect to vinyl chloride monomers. The above-mentioned dispersion stabilizer for suspension polymerization: PVA(A1) was also charged to give a concentration of 400 ppm with respect to vinyl chloride monomers. When charging, deionized water was added so that the total amount of deionized water was 1230 parts. Next, 1.07 parts of a 70% toluene solution of di(2-ethylhexyl) peroxydicarbonate was charged into the autoclave. Nitrogen was introduced into the autoclave so that the pressure in the autoclave was kept at 0.2 MPa and then the introduced nitrogen was purged. This introducing and purging operation was repeated five times to completely replace the air in the autoclave with nitrogen to remove oxygen therefrom, and then 940 parts of vinyl chloride was charged in the autoclave, and the contents of the autoclave were heated to 65° C. with stirring to initiate polymerization of the vinyl chloride monomers. At the start of the polymerization, the pressure in the autoclave was 1.03 MPa. When the pressure in the autoclave reached 0.70 MPa about three hours after the start of the polymerization, the polymerization was stopped. Unreacted vinyl chloride monomers were removed, and polymerization products were recovered and dried at 65° C. for 16 hours. Thus vinyl chloride polymer particles were obtained.

(Evaluation of Vinyl Chloride Polymer Particles)

For the vinyl chloride polymer particles obtained in Example 1, (1) the average particle diameter, (2) the particle size distribution, (3) the plasticizer absorptivity, and (4) the monomer removability were evaluated by the following methods. Table 6 shows the evaluation results.

(1) Average Particle Diameter

The average particle diameter of the vinyl chloride polymer particles was determined with particle size distribution measured by dry sieving using a metal mesh sieve having a Tyler mesh size.

(2) Particle Size Distribution

The content of particles retained on a JIS standard 42-mesh sieve was indicated in mass %.
A: less than 0.5%
B: 0.5% or more and less than 1%
C: 1% or more
The content of particles retained on a JIS standard 60-mesh sieve was indicated in mass %.
A: less than 5%
B: 5% or more and less than 10%
C: 10% or more It is indicated that the lower the content of particles retained on a 42-mesh sieve or a 60-mesh sieve is, the smaller the number of coarse particles formed is and the narrower the particle size distribution is, and thus the higher the polymerization stability is.

(3) Plasticizer Absorptivity

The mass (A g) of a 5 mL syringe filled with 0.02 g of absorbent cotton was measured, 0.5 g of vinyl chloride polymer particles was added to the syringe and the mass (B g) of the resulting syringe was measured. Then, 1 g of dioctyl phthalate (DOP) was added to the syringe, and the resulting syringe was allowed to stand for 15 minutes. Then, the syringe was centrifuged at 3000 rpm for 40 minutes and the mass (C g) of the resulting syringe was measured. The plasticizer absorptivity (%) was determined from the following calculation formula:

$$\text{Plasticizer absorptivity (\%)} = 100 \times [\{(C-A)/(B-A)\}-1]$$

(4) Monomer Removability (Residual Monomer Content)

A polymerization product obtained in the suspension polymerization of vinyl chloride was recovered and then dried at 75° C. for 1 hour and for 3 hours, respectively. The amounts of residual monomers after the 1-hour drying and the 3-hour drying were measured by headspace gas chromatography to determine the residual monomer content from the following formula: (amount of residual monomers after 3-hour drying/amount of residual monomers after 1-hour drying)×100. A lower residual monomer content means that the ratio of the amount of residual monomers removed by drying for 2 hours between the 1-hour drying and the 3-hour drying to the total amount of residual monomers in the vinyl chloride polymer particles is higher. Therefore, the value of the residual monomer content is a measure of the ease of removing residual monomers, that is, the monomer removability.

Examples 2 to 16

Suspension polymerization of vinyl chloride was conducted in the same manner as in Example 1 except that PVA(A2) to PVA(A16) were used, so as to obtain vinyl chloride polymer particles. Table 6 shows the evaluation results of the vinyl chloride polymer particles.

Example 17

Suspension polymerization of vinyl chloride was conducted in the same manner as in Example 1, except that a total 1640 parts of deionized water was charged, so as to obtain vinyl chloride polymer particles. Table 7 shows the evaluation results of the polymer particles thus obtained.

Comparative Example 1

Suspension polymerization of vinyl chloride was conducted in the same manner as in Example 1, except that PVA(A1) was not used. Table 6 shows the evaluation results of the vinyl chloride polymer particles. In this case, the plasticizer absorptivity and monomer removability of the vinyl chloride polymer particles thus obtained were not high enough.

Comparative Example 2

Suspension polymerization of vinyl chloride was conducted in the same manner as in Example 1, except that PVA(A17) synthesized using n-butanethiol as a chain transfer agent was used instead of PVA(A1). Table 6 shows the evaluation results of the vinyl chloride polymer particles. In this case, the monomer removability of the vinyl chloride polymer particles thus obtained was not high enough.

Comparative Example 3

Suspension polymerization of vinyl chloride was conducted in the same manner as in Example 1, except that PVA(A18) synthesized using n-octadecanethiol as a chain transfer agent was used instead of PVA(A1). Table 6 shows the evaluation results of the vinyl chloride polymer particles. In this case, the viscosity of an aqueous liquid of the vinyl chloride polymer particles thus obtained was very high, and its handleability was poor. In addition, the monomer removability of the vinyl chloride polymer particles thus obtained was not high enough.

Comparative Example 4

PVA(A19) having a degree of saponification of 32 mol % was used instead of PVA(A1). However, an aqueous solution of the resulting particles could not be formed probably due to too low degree of saponification of PVA(19), and thus evaluation could not be performed.

Comparative Example 5

Suspension polymerization of vinyl chloride was conducted in the same manner as in Example 1, except that PVA(A20) having a degree of saponification of 72 mol % was used instead of PVA(A1). Table 6 shows the evaluation results of the vinyl chloride polymer particles. In this case, the viscosity of an aqueous liquid of the vinyl chloride polymer particles thus obtained was very high, and its handleability was poor. In addition, the plasticizer absorptivity and monomer removability of the vinyl chloride polymer particles thus obtained were not high enough, and many of the vinyl chloride polymer particles were retained on a 42-mesh sieve and thus the polymerization was unstable.

Comparative Example 6

Suspension polymerization of vinyl chloride was conducted in the same manner as in Example 1, except that PVA(A21) having a viscosity average degree of polymerization of 520 was used instead of PVA(A1). Table 6 shows the evaluation results of the vinyl chloride polymer particles. In this case, the viscosity of an aqueous liquid of the vinyl chloride polymer particles thus obtained was very high, and its handleability was poor. In addition, the plasticizer absorptivity and monomer removability of the vinyl chloride polymer particles thus obtained were not high enough.

Comparative Example 7

Suspension polymerization of vinyl chloride was conducted in the same manner as in Example 1, except that PVA(A22) having a viscosity average degree of polymerization of 80 was used instead of PVA(A1). Table 6 shows the evaluation results of the vinyl chloride polymer particles. In this case, the plasticizer absorptivity and monomer removability of the vinyl chloride polymer particles thus obtained were good. However, the vinyl chloride polymer particles were very coarse and a large proportion of the vinyl chloride polymer particles were retained on a 42-mesh sieve and a 60-mesh sieve, resulting in poor polymerization stability.

Comparative Example 8

Suspension polymerization of vinyl chloride was conducted in the same manner as in Example 1, except that PVA(A23) having a block character of residual acetic acid groups of 0.433 was used instead of PVA(A1). Table 6 shows the evaluation results of the vinyl chloride polymer particles. In this case, the monomer removability of the vinyl chloride polymer particles thus obtained were good. However, the viscosity of an aqueous liquid of the vinyl chloride polymer particles was very high, and its handleability was poor.

Comparative Example 9

Suspension polymerization of vinyl chloride was conducted in the same manner as in Example 1, except that PVA(A24) in the form of an aqueous liquid at a concentration of 55% was used instead of PVA(A1). Table 6 shows the evaluation results of the vinyl chloride polymer particles. In this case, the viscosity of an aqueous liquid of the vinyl chloride polymer particles was very high, and its handleability was poor.

Comparative Example 10

PVA(A25) in the form of an aqueous liquid at a concentration of 15% was used instead of PVA(A1). However, the stability of the aqueous liquid was very poor and precipitation occurred. Thus, evaluation could not be performed.

Comparative Example 11

Suspension polymerization of vinyl chloride was conducted in the same manner as in Example 1, except that PVA(A26) having a formula (1) value of 43 was used instead of PVA(A1). Table 6 shows the evaluation results of the vinyl chloride polymer particles. In this case, the monomer removability of the vinyl chloride polymer particles thus obtained was not high enough.

Comparative Example 12

Suspension polymerization of vinyl chloride was conducted in the same manner as in Example 1, except that PVA(a) having no terminal aliphatic hydrocarbon group was used instead of PVA(A1). Table 6 shows the evaluation results of the vinyl chloride polymer particles. In this case, the monomer removability of the vinyl chloride polymer particles thus obtained was not high enough. As shown in Table 1, the content of vinyl acetate used to synthesize PVA(a) in a solvent was very low, and the yield of each polymerization was low, resulting in low productivity.

Comparative Example 13

Suspension polymerization of vinyl chloride was conducted in the same manner as in Comparative Example 7, except that a total 1640 parts of deionized water was charged, so as to obtain vinyl chloride polymer particles. Table 7 shows the evaluation results of the polymer particles thus obtained. In this case, the vinyl chloride polymer particles were very coarse, and a large proportion of the vinyl chloride polymer particles were retained on a 42-mesh sieve, resulting in poor polymerization stability. Examples 1 and 17 were compared to Comparative Examples 7 and 13 in Table 7. This comparison shows that the use of the dispersion stabilizer for suspension polymerization of the present invention substantially prevents formation of coarse vinyl chloride polymer particles and allows the polymerization to proceed stably even under the polymerization conditions where the ratio of vinyl chloride to water is high and coarse particles are more likely to be formed.

TABLE 6

| | | Evaluation results of vinyl chloride polymer particles | | | | |
|---|---|---|---|---|---|---|
| | | Average particle | Particle size distribution | | Plasticizer | Residual monomer |
| | PVA | diameter (μm) | 42-mesh on | 60-mesh on | absorptivity (%) | content (%) |
| Ex. 1 | PVA(A1) | 143.2 | A | A | 17.4 | 7.5 |
| Ex. 2 | PVA(A2) | 146.8 | A | A | 17.7 | 7.1 |
| Ex. 3 | PVA(A3) | 150.1 | A | A | 17.1 | 8.3 |
| Ex. 4 | PVA(A4) | 149.8 | A | A | 17.5 | 8.1 |
| Ex. 5 | PVA(A5) | 142.4 | A | A | 17.4 | 7.6 |
| Ex. 6 | PVA(A6) | 157.7 | A | A | 18.1 | 6.4 |
| Ex. 7 | PVA(A7) | 154.6 | A | A | 18.0 | 6.6 |
| Ex. 8 | PVA(A8) | 146.1 | A | A | 17.7 | 7.2 |
| Ex. 9 | PVA(A9) | 147.5 | A | A | 17.5 | 7.3 |
| Ex. 10 | PVA(A10) | 151.7 | A | A | 18.4 | 6.0 |
| Ex. 11 | PVA(A11) | 148.3 | A | A | 17.0 | 9.2 |
| Ex. 12 | PVA(A12) | 146.8 | A | A | 17.9 | 6.7 |
| Ex. 13 | PVA(A13) | 149.0 | A | A | 17.6 | 7.6 |
| Ex. 14 | PVA(A14) | 152.4 | A | A | 17.5 | 7.6 |
| Ex. 15 | PVA(A15) | 147.9 | A | A | 17.7 | 7.6 |
| Ex. 16 | PVA(A16) | 142.4 | A | A | 18.2 | 6.2 |
| Com. Ex. 1 | — | 134.2 | B | A | 6.0 | 35.2 |
| Com. Ex. 2 | PVA(A17) | 152.5 | A | A | 16.9 | 16.8 |
| Com. Ex. 3 | PVA(A18) | 142.0 | A | A | 17.3 | 16.5 |
| Com. Ex. 4 | PVA(A19) | — | — | — | — | — |
| Com. Ex. 5 | PVA(A20) | 155.6 | C | A | 12.4 | 24.3 |
| Com. Ex. 6 | PVA(A21) | 132.6 | B | A | 14.1 | 20.3 |
| Com. Ex. 7 | PVA(A22) | 234.2 | C | C | 19.4 | 6.2 |
| Com. Ex. 8 | PVA(A23) | 130.2 | A | A | 17.8 | 4.2 |
| Com. Ex. 9 | PVA(A24) | 147.5 | A | A | 17.4 | 7.4 |
| Com. Ex. 10 | PVA(A25) | — | — | — | — | — |
| Com. Ex. 11 | PVA(A26) | 143.5 | A | A | 17.1 | 15.0 |
| Com. Ex. 12 | PVA(a) | 144.5 | A | A | 16.8 | 18.6 |

TABLE 7

| | | | Evaluation results of vinyl chloride polymer particles | | | | |
|---|---|---|---|---|---|---|---|
| | | Vinyl chloride | Average particle | Particle size distribution | | Plasticizer | Residual monomer |
| | PVA | monomer/ water | diameter (μm) | 42-mesh on | 60-mesh on | absorptivity (%) | content (%) |
| Ex. 1 | PVA(A1) | 940/1230 | 143.2 | A | A | 17.4 | 7.5 |
| Ex. 17 | PVA(A1) | 940/1640 | 130.3 | A | A | 17.5 | 7.2 |
| Com. Ex. 7 | PVA(A22) | 940/1230 | 234.2 | C | C | 19.4 | 6.2 |
| Com. Ex. 13 | PVA(A22) | 940/1640 | 192.6 | C | B | 19.0 | 6.2 |

The dispersion stabilizer for suspension polymerization of the present invention is a dispersion stabilizer for suspension polymerization in the form of an aqueous liquid, containing a PVA(A) having a degree of saponification of 35 mol % or more and 65 mol % or less, a viscosity average degree of polymerization of 100 or more and 480 or less, a terminal aliphatic hydrocarbon group having 6 to 12 carbon atoms, and a block character of residual ester groups of 0.5 or more, at a concentration of 20 mass % or more and 50 mass % or less. In this dispersion stabilizer, the viscosity average degree of polymerization (P) of the PVA(A) and the degree of modification (S) of the aliphatic hydrocarbon group satisfy a specific relationship. As shown in Examples above, when this dispersion stabilizer for suspension polymerization of the present invention is used for suspension polymerization of a vinyl compound, fewer coarse particles are formed due to high polymerization stability, and the resulting particles have a uniform particle size. In addition, polymer particles having high plasticizer absorptivity can be obtained. In particular, this dispersion stabilizer is very effective in terms of monomer removability, and thus polymer particles having high residual monomer removal efficiency can be obtained. Furthermore, this dispersion stabilizer for suspension polymerization is a low-viscosity and high-concentration aqueous liquid containing no intentionally added organic solvent such as methanol, and thus it has very high handleability and it is less environmentally harmful. Its productivity is also high when it is produced. Therefore, the dispersion stabilizer for suspension polymerization of the present invention is very useful for industrial applications.

INDUSTRIAL APPLICABILITY

The present invention is useful in producing various vinyl resins in particular, vinyl chloride resins) by suspension polymerization.

The invention claimed is:

1. A dispersion stabilizer for suspension polymerization in the form of an aqueous liquid, comprising:
    a vinyl alcohol polymer (A) having a degree of saponification of 35 to less than 60 mol %, a viscosity average degree of polymerization (P) of 100 to 480, a terminal aliphatic hydrocarbon group having 6 to 12 carbon atoms, and a block character of residual ester groups of 0.5 to 2; and
    water, wherein
    the block character is determined by $^{13}$C-NMR spectroscopy, the viscosity average degree of polymerization (P) is calculated using the following Nakajima's equation, $$[\eta]_{acetone,\ 30°\ C.} = 7.94 \times 10^{-4} \cdot P^{0.62}$$

the dispersion stabilizer is in the form of an aqueous liquid,
    the vinyl alcohol polymer (A) is present at a concentration of 20 to 50 mass % in said aqueous liquid, and
    wherein the relationship between the viscosity average degree of polymerization (P) of the vinyl alcohol polymer (A) and a degree of modification (S) of the aliphatic hydrocarbon group satisfies the following formula (1):

$$50 \leq S \times P / 1.880 \leq 100 \tag{1}$$

2. The dispersion stabilizer for suspension polymerization according to claim 1, wherein the viscosity average degree of polymerization (P) of the vinyl alcohol polymer (A) is 150 to 480.

3. The dispersion stabilizer for suspension polymerization according to claim 1, further comprising a vinyl alcohol polymer (B) having a degree of saponification of more than 65 to 95 mol % and a viscosity average degree of polymerization of more than 480 to 8,000, wherein
    the viscosity average degree of polymerization (P) is calculated using the following Nakajima's equation, $$[\eta]_{acetone,\ 30°\ C.} = 7.94 \times 10^{-4} \cdot P^{0.62}.$$

4. The dispersion stabilizer for suspension polymerization according to claim 3, wherein the mass ratio between the vinyl alcohol polymer (A) and the vinyl alcohol polymer (B) ([vinyl alcohol polymer (A)]/[vinyl alcohol polymer (B)]) is 10/90 to 55/45 in terms of solid content ratio.

5. A method for producing a vinyl resin, comprising conducting suspension polymerization of a vinyl compound in the presence of the dispersion stabilizer for suspension polymerization according to claim 1.

6. The method according to claim 5, wherein the suspension polymerization is conducted in the presence of water, and the mass ratio between the vinyl compound and the water ([vinyl compound]/[water]) is more than 3/4 to less than 10/9.

* * * * *